(12) United States Patent
Perna

(10) Patent No.: US 9,400,334 B2
(45) Date of Patent: Jul. 26, 2016

(54) SCINTILLATOR ARRAY, A SCINTILLATOR, A RADIATION DETECTION APPARATUS INCLUDING THE SCINTILLATOR ARRAY OR SCINTILLATOR, AND PROCESSES OF FORMING THE SAME

(71) Applicant: Louis Perna, Elyria, OH (US)

(72) Inventor: Louis Perna, Elyria, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 291 days.

(21) Appl. No.: 14/039,277

(22) Filed: Sep. 27, 2013

(65) Prior Publication Data

US 2014/0231676 A1    Aug. 21, 2014

Related U.S. Application Data

(60) Provisional application No. 61/706,235, filed on Sep. 27, 2012.

(51) Int. Cl.
  *G01J 1/58* (2006.01)
  *G01T 1/20* (2006.01)

(52) U.S. Cl.
  CPC ......... *G01T 1/2002* (2013.01); *Y10T 29/49826* (2015.01)

(58) Field of Classification Search
  CPC ..................... G01T 1/2002; B29K 2995/003
  See application file for complete search history.

(56) References Cited

U.S. PATENT DOCUMENTS

| | | | |
|---|---|---|---|
| 4,831,263 A | 5/1989 | Yamashita | |
| 5,091,650 A | 2/1992 | Uchida et al. | |
| 6,015,974 A | 1/2000 | Genna | |
| 6,278,832 B1 | 8/2001 | Zagumennyi et al. | |
| 2003/0178570 A1 | 9/2003 | Tsunota et al. | |
| 2005/0167605 A1* | 8/2005 | Juni | 250/370.11 |
| 2005/0210755 A1* | 9/2005 | Cho et al. | 51/293 |
| 2010/0116995 A1 | 5/2010 | Levene et al. | |
| 2010/0148074 A1* | 6/2010 | Menge et al. | 250/362 |

(Continued)

FOREIGN PATENT DOCUMENTS

WO    2012/004703 A2    1/2012

OTHER PUBLICATIONS 3M optical systems: Vikuiti Enhanced Specular Reflector (ESR) 2010, available at http://www.apioptics.com/pdf/ESR.pdf.*
Dupont Tejin films, 2006, available at http://www.dupontteijinfilms.com/FilmEnterprise/Datasheetasp?ID=776&Version=US.*
Gloss measurement, available at http://www.elcometer.com/en/gloss-measurement.html.*
BC-620, Reflector Paint for Plastic Scintillators, 2005, available at: http://www.crystals.saint-gobain.com/uploadedFiles/SG-Crystals/Documents/SGC%20BC620%20data%20sheet.pdf.*
International Search Report for PCT/US2013/062177, mailed Jul. 10, 2014, 15 pages.

*Primary Examiner* — David J Makiya
*Assistant Examiner* — Kenneth J Malkowski
(74) *Attorney, Agent, or Firm* — Abel Law Group, LLP

(57) ABSTRACT

A scintillator can include a photosensor surface and a side surface adjacent to the photosensor surface. The photosensor surface can be adapted to provide scintillating light to a photosensor. In an embodiment, the scintillator can have grooves along the side surface, wherein the grooves have lengths extending in a direction toward the photosensor surface. In another embodiment, the scintillator can include a reflector and a clear adhesive between the scintillator and reflector. In a particular embodiment, the reflector is substantially white and has a gloss value of at least 50. The scintillator can be in the form of a scintillator element of an array or in the form of a single scintillator. The scintillator can be coupled to a photosensor within a radiation detection apparatus. For an array, a process of forming the array can include forming grooves along one or more side surfaces during a fabrication process.

19 Claims, 4 Drawing Sheets

(56) References Cited

U.S. PATENT DOCUMENTS

| | | | |
|---|---|---|---|
| 2010/0155610 A1* | 6/2010 | Menge et al. ............ 250/368 |
| 2011/0108733 A1 | 5/2011 | Menge |
| 2012/0056104 A1 | 3/2012 | Perna |
| 2013/0240742 A1 | 9/2013 | Menge |

* cited by examiner

SCINTILLATOR ARRAY, A SCINTILLATOR, A RADIATION DETECTION APPARATUS INCLUDING THE SCINTILLATOR ARRAY OR SCINTILLATOR, AND PROCESSES OF FORMING THE SAME

CROSS-REFERENCE TO RELATED APPLICATION

This application claims priority under 35 U.S.C. §119(e) to U.S. Patent Application No. 61/706,235 entitled "Scintillator Array, A Scintillator, A Radiation Detection Apparatus Including The Scintillator Array Or Scintillator, And Processes of Forming The Same", by Louis Perna, filed Sep. 27, 2012, which is assigned to the current assignee hereof and incorporated herein by reference in its entirety.

FIELD OF THE DISCLOSURE

The present disclosure is directed to scintillator arrays, scintillators, radiation detection apparatuses including the scintillator arrays or scintillators, and processes of forming the same.

BACKGROUND

Radiation detection apparatuses are used in a variety of applications. For example, radiation detector apparatuses can include scintillator arrays that can be used for imaging applications, such as a medical diagnostic apparatus, or a security screening apparatus, military applications, or the like. Further improvement of radiation detection apparatuses is desired.

BRIEF DESCRIPTION OF THE DRAWINGS

Embodiments are illustrated by way of example and are not limited by the accompanying figures.

Figure 1:
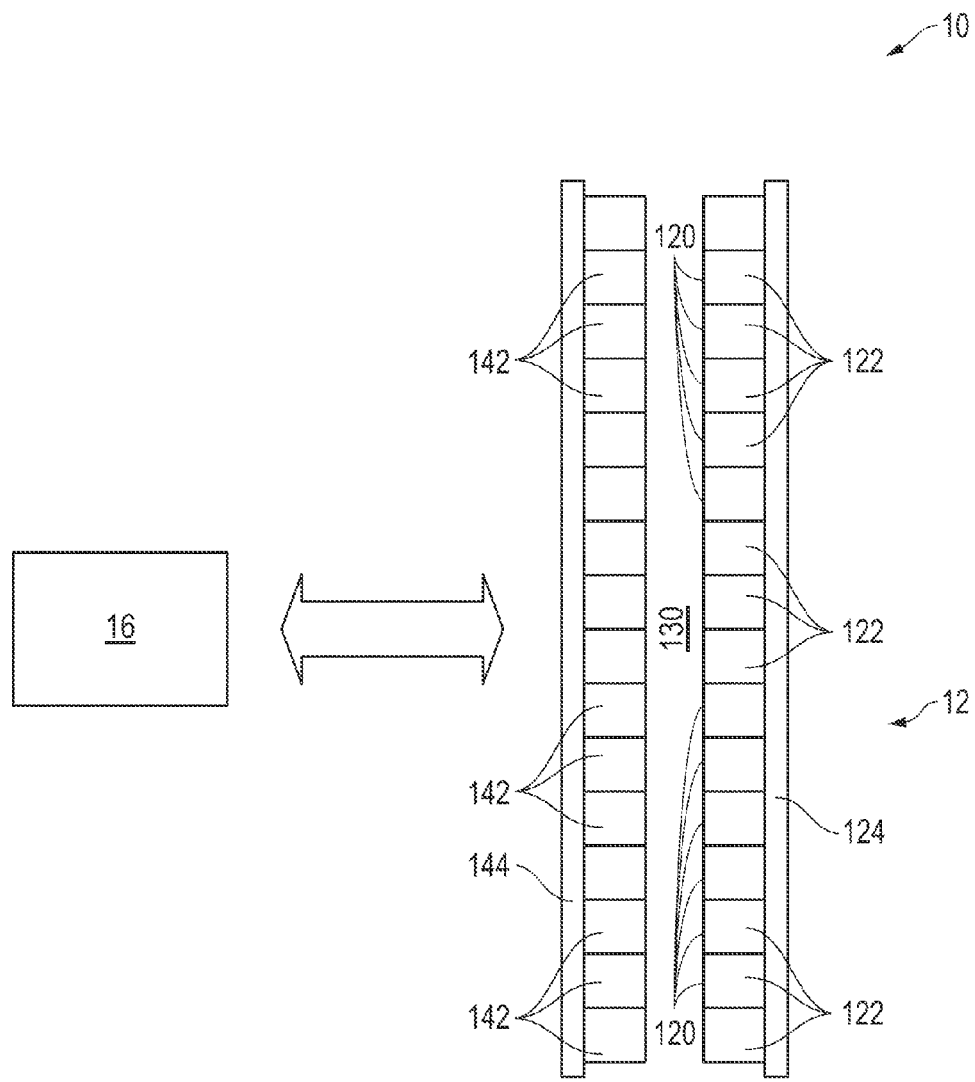
FIG. 1 includes a depiction of a radiation detection apparatus in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "immediately adjacent" with respect to two particular items within an array is intended to mean that no other similar item is disposed between the two particular items. For example, in a scintillator array of scintillator elements, two immediately adjacent scintillator elements may contact or be spaced apart from each other; however, no other scintillator element is disposed between the two immediately adjacent scintillator elements. Note that air, a reflective sheet, a filling material, or the like may be disposed between the two immediately adjacent scintillator elements.

The term "photosensor surface," with respect to a scintillator element, is intended to mean a surface coupled to or intended to be coupled to a photosensor. The term "side surface," with respect to a scintillator element, is intended to mean a surface adjacent to the photosensor surface.

The term "rare earth" or "rare earth element" is intended to mean Y, Sc, and the Lanthanides (La to Lu) in the Periodic Table of the Elements. In chemical formulas, a rare earth element will be represented by "RE."

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Scintillator elements within a pixel array or a scintillator can have a photosensor surface adapted to provide scintillating light to a photosensor. In an embodiment, substantially white reflective sheets can be between pairs of scintillator elements, and a clear adhesive can be disposed between the reflective sheets and the scintillator elements. In a particular embodiment, the reflective sheets can have a gloss value of at least approximately 50. In a further embodiment, the scintillator elements or scintillator can include grooves along one or more sides of the scintillator elements or scintillator. The grooves can have lengths in a direction toward the photosensor surface. The substantially white reflective sheets, clear adhesive, grooves, or any combination thereof can help improve the light output from the scintillator elements or the scintillator, which in turn can help improve the signal-to-noise ratio when optically coupled to a photosensor in a radiation detection apparatus.

FIG. 1 illustrates an embodiment of a radiation detection apparatus 10. The radiation detection apparatus can be a medical imaging apparatus, a well logging apparatus, a security inspection apparatus, a neutron detection apparatus, military applications, or the like.

In the embodiment illustrated, the radiation detection apparatus 10 includes an array 12 of scintillator elements 122, an array 14 of photosensors 142, and a control module 16. The array 12 includes scintillator elements 122 and a backing material 124. The scintillator elements 122 can include an inorganic scintillator material, such as a rare earth or other metal halide; a rare earth sulfide, oxysulfide, germinate, silicate (for example, an oxyorthosilicate, a pyrosilicate, or the like); a garnet; $CdWO_4$; $CaWO_4$; ZnS; ZnO; ZnCdS; another suitable scintillator material; or the like. In a particular embodiment, the scintillator elements 122 can include a lutetium oxyorthosilicate, lutetium yttrium oxyorthosilicate, a rare earth aluminum garnet, a cesium iodide, or an elpasolite. The scintillator material can be polycrystalline or substantially monocrystalline. In an embodiment, the scintillator elements 122 can generate scintillating light when the scintillator elements 122 capture the targeted radiation. In a particular embodiment, the targeted radiation can include gamma radiation, x-rays, neutrons, another suitable radiation, or any combination thereof. Scintillating light from the scintillator elements 122 pass through their photosensor surfaces 120, and thus the photosensor surfaces 120 can provide scintillating light to the photosensors 142.

The backing material 124 can be substantially transparent to the targeted radiation. In an embodiment, the backing material 124 may be substantially opaque to the scintillating light. In this manner, ambient light from outside the radiation detection apparatus 10 is less likely to be misinterpreted by the array 14 of photosensors 142 or the control module 16 as being scintillating light. The backing material 124 can include a plastic, such as epoxy, polypropylene, another polymer, or any combination thereof. The backing material 124 itself may be reflective or a reflective material may be disposed between the scintillator elements 122 and the backing material 124. Further, an adhesive compound may be disposed between the scintillator elements 122 and the backing material 124, if needed or desired. The adhesive compound can be reflective or optically transparent or translucent to scintillating light. The shapes, sizes, and spacings for the scintillator elements 122 within the array 12 are discussed in more detail later in this specification.

The array 14 includes photosensors 142 and a substrate 144. The scintillator elements 122 are optically coupled to the photosensors 142. A substantially transparent material 130 can be disposed between the scintillator elements 122 and the photosensors 142. The material 130 can be in the form of a solid, a liquid, or a gas. In another embodiment, not illustrated, the scintillator elements 122 can contact the photosensors 142. The ratio of scintillator elements 122 to photosensors 142 can be 1:1, 2:1, 5:1, or even higher.

The photosensors 142 can include photomultiplier tubes, semiconductor-based photomultipliers, hybrid photosensors, or any combination thereof. The photosensors 142 can receive photons emitted by the scintillator elements 122 and then produce electronic pulses corresponding to photons that are received. In a particular embodiment, the substrate 144 can include electrical connectors for the photosensors 142, a printed wiring board for routing electronic signals, or the like.

The photosensors 142 are electrically coupled to the control module 16. In the embodiment as illustrated, the photosensors 142 are bi-directionally coupled to the control module 16, and in another embodiment (not illustrated), the photosensors 142 are uni-directionally coupled to the control module 16. Electronic pulses from the photosensors 142 can be shaped, digitized, analyzed, or any combination thereof by the control module 16 to provide a count of the photons received at the photosensors 142 and produce information for an image or other purposes. The control module 16 can include an amplifier, a pre-amplifier, a discriminator, an analog-to-digital signal converter, a photon counter, another electronic component, or any combination thereof. The control module 16 can include logic to determine the location of the particular scintillating element or scintillator elements receiving targeted radiation based on the electronic pulses, or a lack thereof, and based at least in part on electronic pulses provided by the photosensors 142. An image may be generated from the location and intensity information from the control module 16.

Figure 2:
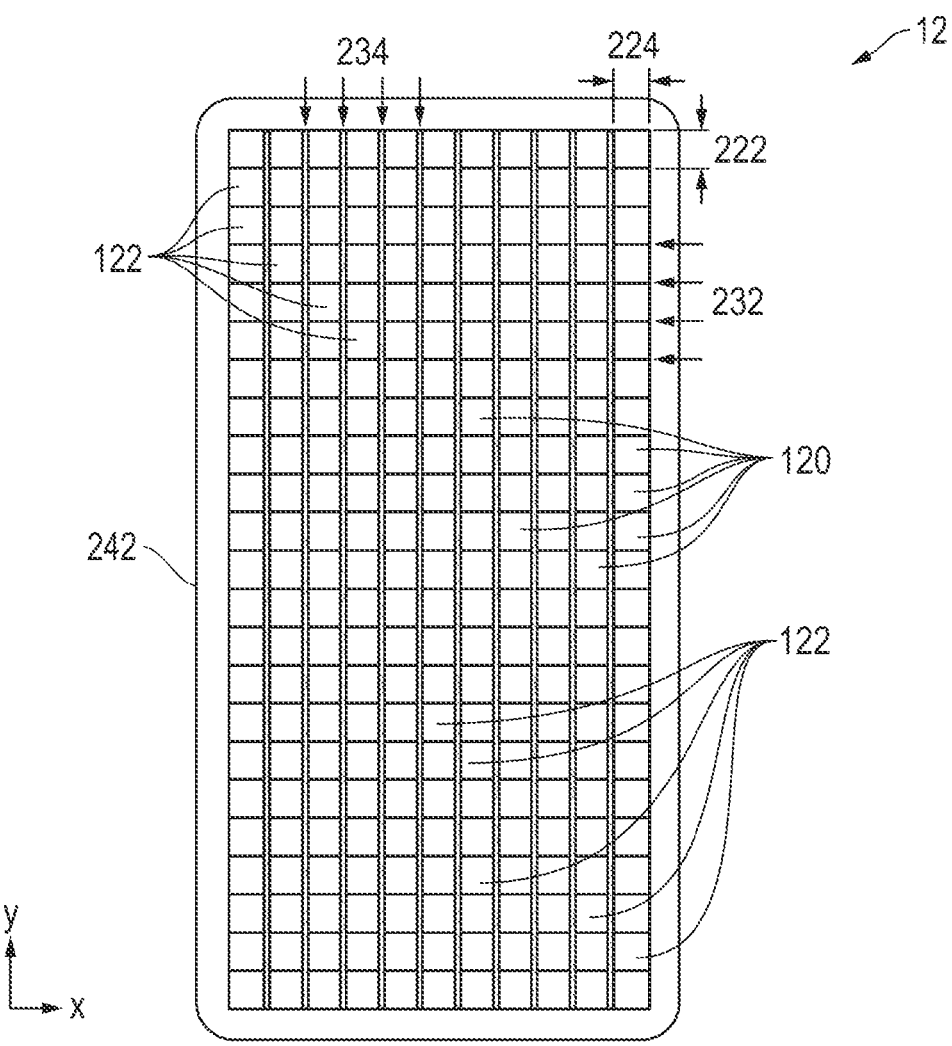
FIG. 2 includes an illustration of an array of scintillator elements in accordance with an embodiment.

FIG. 2 includes illustration of the array 12, as it would be seen by the photosensors 142 of the array 14. Thus, the photosensor surfaces 120 of the scintillator elements 122 are seen in FIG. 2. In the embodiment as illustrated, the scintillator elements 122 are organized into rows and columns that lie along hypothetical lines extending in the x-direction and the y-direction. In another embodiment, a different organization may be used. The scintillator elements 122 are separated from one another by spaces 232 and spaces 234. The array 12 can be surrounded with a white, opaque material 242. In a non-limiting embodiment, the material 242 can include a white epoxy, a white silicone rubber, or another suitable material.

The lengths of the spaces 232 are illustrated as extending in the x-direction, and the lengths of spaces 234 are illustrated as extending in the y-direction. The lengths of the spaces 232 are substantially parallel to one another and are substantially perpendicular to lengths of the spaces 234. Similar to the spaces 232, the spaces 234 are substantially parallel to one another. In another embodiment, the lengths of the spaces 232 may lie along lines that intersect one another, and the lengths of the spaces 232 may intersect the lengths of the spaces 234 at angles other than 90°. In a particular embodiment (not illustrated), the scintillator elements 122 may be in the form of parallelograms, whose angles defined by two adjacent sides are acute angles or obtuse angles. Similar to the lengths of the spaces 232, the lengths of the spaces 234 may lie along lines that intersect one another. In another particular embodiment (not illustrated), the scintillator elements 122 may have shapes.

As the targeted radiation is captured by a particular scintillator element 122, that particular scintillator element 122 can emit scintillating light. In another embodiment, scintillating light may be generated by a plurality of scintillator elements 122, and the intensity of scintillating light may be different between scintillator elements 122. The scintillating light can be received by and converted to electronic pulses by the photosensors 142, which can be used to determine the particular location where the targeted radiation was captured by the array 12.

The scintillator elements 122 are illustrated as being rectangular. In another embodiment, the scintillator elements 122 may have a different shape, such as another quadrilateral, a hexagon, an octagonal, another polygon, a circle, an oval, an ellipsoid, or the like. In a further embodiment (not illustrated), the scintillator elements 122 may have different shapes within the same array. After reading this specification, skilled artisans will be able to determine the shape of scintillator elements 122 that meets the needs or desires for a particular application.

Each of the scintillator elements 122 has a length 222, a width 224, and a thickness (not illustrated in FIG. 2). The thicknesses extend into the page for FIG. 2. In an embodiment, the lengths and the widths of the scintillator elements 122 are no greater than approximately 9 mm, in another embodiment, no greater than approximately 5 mm, and in a further embodiment, no greater than approximately 3 mm. In a particular embodiment, the lengths and the widths of the scintillator elements 122 are in a range of approximately 1 to 2 mm. The depths of the scintillator elements 122 may be at least in part determined by the stopping power of the scintillator material within the scintillator elements 122. Ideally, all of the targeted radiation that reaches a scintillator element 122 is captured by that scintillator element 122. The aspect ratio of a scintillator element is the ratio of the depths of the scintillator element, as measured along the central axis of the scintillator element, to either of the length or width of the photosensor surface of the scintillator element. In an embodiment, the median aspect ratio of the scintillator elements 122 is at least approximately 2:1, at least approximately 4:1, or at least approximately 7:1. Although there is no theoretical limit to the aspect ratio, the aspect ratio may be no greater than approximately 50:1, no greater than approximately 40:1, or no greater than approximately 20:1. Grooves (not illustrated in FIG. 2) are along the scintillator elements at the sides immediately adjacent to the spaces 232 and 234. The grooves are formed during the process of fabricating the scintillator array as is described in more detail below.

Attention is now directed to processes of making the radiation detection apparatus 10 as illustrated in FIGS. 3 to 6. While the formation of the array 12 is illustrated with respect to particular shapes, skilled artisans will appreciate that other shapes may be used.

Figure 3:
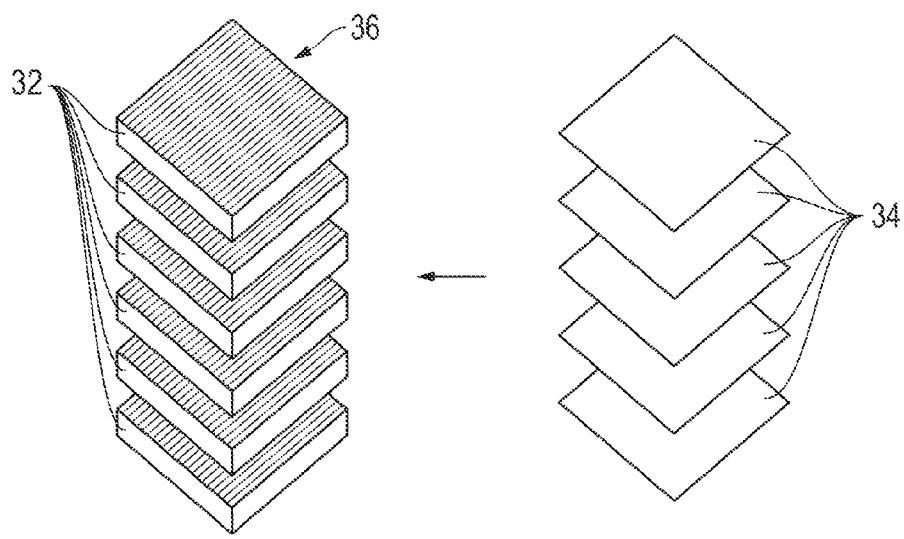
FIG. 3 includes an illustration of plates of scintillator material having grooves along their surfaces and reflective sheets inserted between each adjacent piece before joining the pieces together.

FIG. 3 includes an illustration of a perspective view of plates 32 that include a scintillator material, and reflective sheets 34 of a reflective material. A block of a scintillator material can be cut to form the plates 32. The plates 32 can include any of the scintillator materials previously described. The plates 32 can have substantially identical shapes. In the embodiment as illustrated, the faces of each plate 32 are along the top and bottom surfaces of each plate 32 and are separated by the thickness. The faces can have a shape, such as another quadrilateral, a hexagon, an octagonal, another polygon, a circle, or the like. In another embodiment, the plates 32 may have different shapes as compared to one another. The thicknesses of the plates 32 can be substantially the same or may be different. Thus, in an embodiment, the thicknesses of the plates 32 are no greater than approximately 9 mm, in another embodiment, no greater than approximately 5 mm, and in a further embodiment, no greater than approximately 3 mm.

The plates 32 includes grooves 36 that can be formed during the cutting action when forming the plates 32 or may be formed after cutting the plates 32. The cutting operation can be performed using a saw, a laser, a water jet, another suitable cutting tool, or any combination thereof. In a particular embodiment, the cutting operation can be performed using a wire saw. The plates 32 may be milled, polished, or other suitable processing to form the grooves 36. The grooves 36 may be formed by a tool that leaves tool marks. Milling can be used when the scintillator material is relatively soft. Such a relatively soft scintillator material can include a metal halide, a scintillator plastic, or the like. Polishing can be used when the scintillator material is relatively hard. Such a relatively hard scintillator material can include a metal silicate, a metal germinate, a garnet, or the like. Grooves 36 can be formed along opposite sides of the plates 32, so the lower sides of the plates 32 also have grooves 36, although grooves 36 along such lower sides are not illustrated in FIG. 3.

Abrasive particles used in milling or polishing can include diamond, alumina, or another material that is harder than the scintillator material in which the grooves 36 are formed. In an embodiment, the average particle size of the abrasive particles is at least approximately 9 microns, at least approximately 15 microns, or at least approximately 30 microns, and in another embodiment, the average particle size of the abrasive particles is no greater than approximately 900 microns, no greater than approximately 300 microns, at least approximately 90 microns, or no greater than 50 microns. In a particular embodiment, the average particle size of the abrasive particles is in a range of approximately 30 to approximately 90 microns.

The reflective sheets 34 can be placed between the plates 32. In an embodiment, the reflective sheet 34 can include a substantially white plastic sheet, such as a polyester, a polytetrafluoroethylene, or the like. In a particular embodiment, the substantially white plastic sheet has a gloss value of at least approximately 50, at least approximately 55, or at least approximately 60, and in another embodiment, the gloss value may be no greater than approximately 75, no greater than approximately 60, no greater than approximately 50. The gloss value can be obtained by measuring samples of the reflector material at an angle of 60° using a micro-gloss 60°™-brand gloss meter available from BYK-Gardner USA of Columbia, Md., USA.

In another embodiment, the reflective sheet 34 can include a metal foil or a metalized plastic sheet, such as a metalized polyester, may be used. In still a further embodiment, the reflective sheet 34 can be a substantially white reflective sheet having a gloss value less than 50. Although the metal foil, metalized plastic sheet, or a substantially white reflective sheet with the lower gloss value may be used in some applications, the substantially white reflective sheet with the higher gloss value can produce the highest light output as compared to such other reflectors.

The thicknesses of the reflective sheets 34 can be substantially the same or may be different from one another. The reflective sheets 34 may have a shape that substantially corresponds to the shapes of the plates 32. In another embodiment the reflective sheets 34 may be larger or smaller than the facial area of the plates 32. The thicknesses of the reflective sheets 34 may generally correspond to the widths of the spaces 232 as illustrated in FIG. 2. In an embodiment, the thicknesses of the reflective sheets may be no greater than approximately 0.10 mm (approximately 4 mils).

An adhesive material can be applied to faces of the plates 32, and the reflective sheets 34 can be inserted between each of the plates 32 as generally illustrated by the arrow in FIG. 3. The adhesive material can be a clear adhesive, such as a clear epoxy or a clear silicone rubber. The thickness of the adhesive material may be no greater than approximately 25 microns, no greater than approximately 20 microns, or no greater than 15 microns. In another embodiment, the thickness of the adhesive material can be at least approximately 2 nm.

Figure 4:
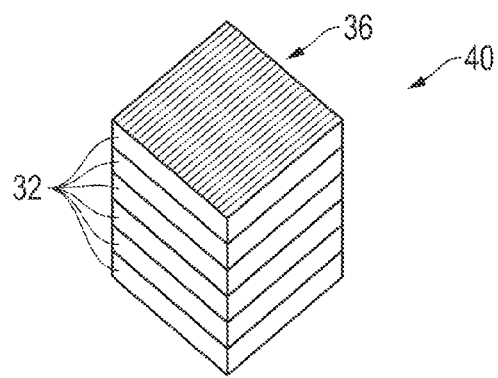
FIG. 4 includes an illustration of the plates of scintillator material of FIG. 3 after joining the plates together.

The plates 32, reflective sheets 34, and adhesive material can then be joined together to form an object 40 as illustrated in FIG. 4. Due to the relatively thinner thicknesses of the reflective sheets 34 (as compared to the plates 32), the reflective sheets 34 are not illustrated in subsequent figures, although the reflective sheets 34 are present. The joining can be performed by pressing the plates 32 and reflective sheets 34 together, and then removing any residual adhesive material that may flow from the region between the plates 32. As used herein, such region is referred to as a joining region which includes the region between faces of immediately adjacent plates 32. Therefore, the joining region can include one of the reflective sheets 34 and the adhesive material that remains between the plates 32. In the embodiment as illustrated in FIG. 4, the object 40 can be in the shape of a block. In another embodiment, the adhesive material may not be required, as the reflective sheet 34 may be adhesive, or the plates 32 and reflective sheets 34 may be joined such that an adhesive material is not required.

Figure 5:
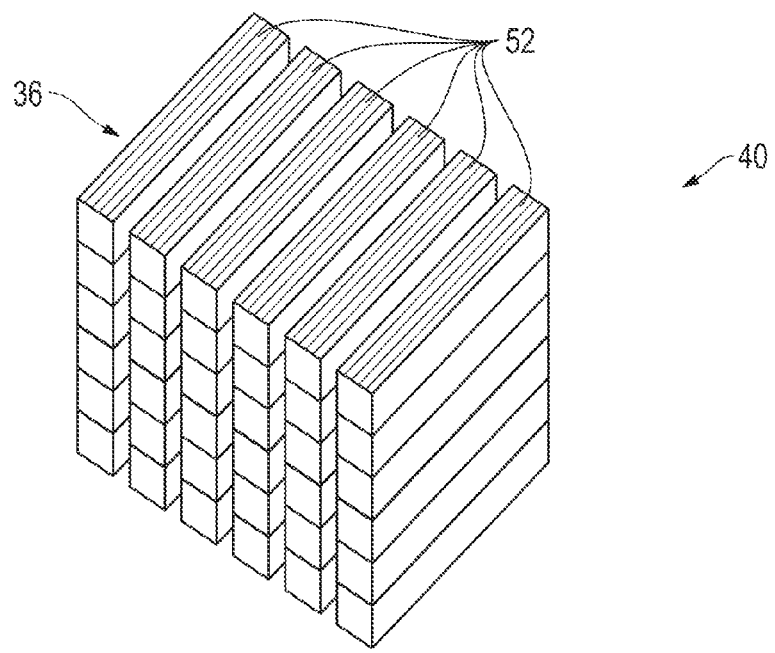
FIG. 5 includes an illustration of slices of scintillator material of FIG. 4 after cutting portions of the joined plates.

FIG. 5 includes an illustration of a perspective view after the object 40 is cut into slices 52. In the embodiment as illustrated, the slices 52 have a thickness of approximately 2 mm. The cutting may be substantially perpendicular to the joining regions or at a significantly different angle.

Figure 6:
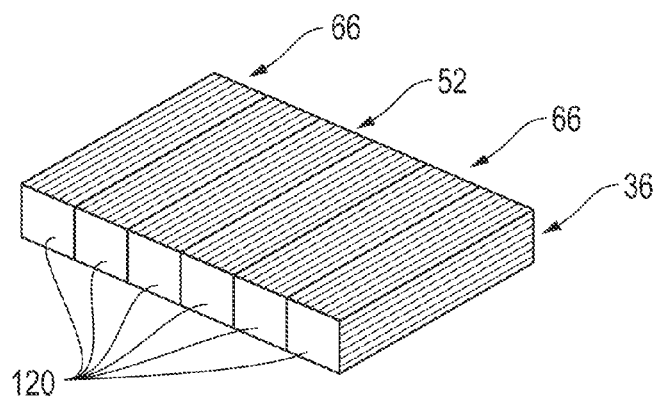
FIG. 6 includes an illustration of the portion of FIG. 5 after forming grooves along the side surfaces of scintillator elements.

FIG. 6 includes an illustration of a perspective view after grooves 66 are formed along opposite sides of a slice 52. Other slices 52 would also include grooves 66 that have lengths that extend in the same general direction as the previously-formed grooves 36. The grooves 66 can be formed using any of the equipment, materials, and techniques as previously described with respect to the grooves 36. The grooves 66 can be formed using the same equipment or different equipment, the same material or different materials, or the same technique or different techniques as compared to the grooves 36. Similar to the grooves 36, the grooves 66 can be formed along opposite sides of the slices 52.

The grooves 36, 66, or any combination of such grooves for each scintillator element 122 are ideally parallel to the centerline axis of such scintillator element 122. In practice, the grooves may have deviation angles as measured relative to a plane, wherein a centerline axis extends through a center of the photosensor surface 120, and the centerline axis lies along the plane and the plane intersects the side surface. A groove near a center of the side surface may have a different deviation angle as compared to another groove along the same side surface and further from the center of the side surface. In an embodiment, the median value for the deviation angles for a scintillator element 122 may be no greater than approximately 9°, no greater than approximately 5°, no greater than approximately 2°, or no greater than approximately 0.9°, and in another embodiment, median value for the deviation angles may be at least approximately 0.0001°. The grooves 36, 66, or any combination of such grooves can extend along at least approximately 50%, at least approximately 75%, at least approximately 90%, or at least approximately 95% of the length of its corresponding scintillator element 122. In a particular embodiment, the grooves extend along substantially all of the length of such scintillator element. The grooves have corresponding lines, and at least 50%, at least approximately 80%, or at least approximately 90% of the corresponding lines intersect the photosensor surfaces 120. In an embodiment, the grooves can have a median depth of at least approximately 0.5 micron, at least approximately 2 microns, or at least approximately 5 microns, and in another embodiment, the grooves can have a median depth no greater than approximately 200 microns, no greater than approximately 90 microns, or no greater than approximately 50 microns. In a further embodiment, the grooves can have a median width of at least approximately 0.5 micron, at least approximately 2 microns, or at least approximately 5 microns, and in another embodiment, the grooves can have a median depth no greater than approximately 200 microns, no greater than approximately 90 microns, or no greater than approximately 50 microns.

At least two of the grooves 36, 66, or any combination of such grooves can have different depths, different widths, or both. For any particular groove 36 or 66, the spacings between such groove and the immediately adjacent grooves on opposite sides of the particular groove can be different. The grooves 36, 66, or any combination of such grooves can have a random assortment of depths, widths or both. The spacings between immediately adjacent grooves can be a random assortment of spacings. As used herein, "random" is intended to mean that the depths, widths, or spacings do not have a uniform depth, width, or spacing, or a predetermined pattern of depths, widths, or spacings. For example, the depths of the grooves that change as a function of distance from the centerline axis of a scintillator element 122 are not random. Because the milling may involve particles of different sizes that may be non-uniformly spaced apart from one other, the grooves may reflect this, and thus, milling is likely to form grooves that have random widths, random depths, and random spacings. In a particular embodiment, the grooves along the same side of the scintillator element 122 can have random widths, random depths, random spacings, or any combination thereof.

The slices 52 can be organized into row and columns to form an array, such as array 12 in FIGS. 1 and 2. The spaces 232 may correspond to locations where the reflective sheets 34 are located. The slices 52 may be mounted onto the backing material 124. The spaces 234 can be filled with a reflective material that can include a substantially white or specular material. In a particular embodiment, the reflective material 82 can include an epoxy or other polymeric material that includes white or metal particles. In an alternative embodiment, the spaces 234 may be left open and not subsequently filled. The array 12 can be encapsulated with the white, opaque material 242. In an embodiment, the white, opaque material 242 is formed such that it encapsulates the array 12, and the portion of the white, opaque material lying along the photosensor surfaces 120 is removed to expose the photosensor surfaces 120. In another embodiment, the photosensor surfaces 120 may be covered so that the white, opaque material 242 does not cover the photosensor surfaces 120, such that a removal step is not needed or only needs to be removed along small portions of the photosensor surfaces for scintillator elements 122 at the perimeter of the array. In a particular embodiment, the application of the materials 82 and 242 can be performed during the same process sequence using the same material or same set of materials.

In the scintillator array 12, the reflective sheets 34 and the clear adhesive material is along opposite side surfaces of the scintillator elements 122, and the reflective material 82, and no clear adhesive, is along the other opposite side surfaces. In this manner, cross talk between scintillator elements 122 can be kept low without having to use a complicated fabrication process.

Referring to FIG. 1, the scintillator array 12 and the photosensor array 14 can then be mounted within an apparatus such that the scintillator elements 122 and the photosensors 142 are optically coupled to one another. The photosensors 142 can electrically coupled to the control module 16 through connectors, wirings, ribbon cables, switches or other electronic components used in the apparatus.

In another embodiment, not all of the side surfaces have grooves. The grooves can be along at least one side surface for more than 50% of the scintillator elements 122. In another embodiment, two side surfaces of more than 50% of the scintillator elements 122 have grooves. The two side surfaces can be adjacent to or opposite each other. Two other side surfaces may or may not have grooves. In still another embodiment, three side surfaces of more than 50% of the scintillator elements have grooves. For the three sides described, the particular scintillator elements making up more than 50% of the scintillator elements for each of the sides may be the same particular scintillator elements of different combinations of scintillator elements.

Along a side surface, a groove having a length in a direction substantially parallel to the photosensor surface 120 is not desired, as scintillating light will not be propagated towards the photosensor surface 120 as effectively as grooves substantially parallel to the central axes. Due to handling or another issue, such a groove may be present on a side surface at the perimeter of the array 12. The side surfaces for interior scintillator elements 122, which are spaced apart from the outer perimeter of the array 12, are protected and may not have a groove along a side surface that is substantially parallel to the photosensor surface 120.

In a further embodiment, one or more side surfaces that are to have grooves may not due to operator error or another reason. Thus, an interior scintillator element 122 may not have any grooves along a side surface even though well over 90% of the other interior scintillator elements 122 in the array 12 have grooves along all side surfaces.

The grooves may be useful for an apparatus that has a single scintillator. The single scintillator has a cylindrical shape and only one side surface, and the one side surface can includes grooves similar to the grooves 36. In another embodiment, the single scintillator can have a different shape with a plurality of side surfaces. One, some, or all of the side surfaces can have grooves similar to the grooves 36. In a particular embodiment, the clear adhesive material, the reflective sheet, or both can substantially laterally surround the single scintillator.

Embodiments described herein can improve signal-to-noise ratio for radiation detection apparatus. The clear adhesive, substantially white reflector, grooves, or any combination thereof help scintillating light to propagate towards the photosensor surface of the scintillator, and thus, scintillating light output can be improved. The scintillating light output can be increased by 30% to 50% as compared to substantially identical scintillator elements that do not have grooves along the side surfaces, reflective sheets 34 that are substantially white and have a gloss value of at least approximately 50, and a clear adhesive material between scintillator elements 122 and the reflective sheets 34. The amount of improvement in light output is unexpected. Note that in particular embodiment, not all side surfaces need to have grooves, and the reflective sheets 34 do not need to be substantially white and have a gloss value of at least approximately 50. Grooves along one or some side surfaces, but not all side surfaces, can improve scintillating light output. Further, the reflective sheets that include a metal foil, a metalized plastic, or a substantially white reflector with a gloss value less than 50 may be used, although the improvement may not be as great. More scintillating light reaching a photosensor allows the photosensor to generate a stronger electronic signal. The concepts as described herein are not expected to increase background noise. Therefore, the signal-to-noise ratio is higher.

The improvement in light output can be affected by the aspect ratio of the scintillator elements. The aspect ratio of a scintillator element is the ratio of the depth of the scintillator element, as measured along the central axis, to either of the length or width of the photosensor surface of the scintillator element. The relative improvement in light output over conventional scintillator arrays becomes significant at the aspect ratio becomes greater.

In a conventional array, plates and slices could be cut to the desired final thicknesses. If the plates or slices were too thick, the plates or slices could be milled to the desired final thicknesses. In the conventional scintillator array, some scintillator elements may not have any grooves along the side surfaces, other scintillator elements may have grooves along a side surface that have lengths that are substantially parallel to the photosensor surfaces, and still other scintillator elements may have grooves along a side surface that have lengths that extend towards the photosensor surfaces. In the conventional array, substantially less that 50% of the scintillator elements have grooves along a side surface that have lengths that extend towards the photosensor surfaces. Further, the scintillator array has poor scintillating light output uniformity between scintillator elements, which is undesired. Unlike a conventional array, scintillator elements 122 as described herein can be fabricated with grooves that help improve scintillating light output and result in substantially more uniform scintillating light output between different scintillator elements 122 within the array.

Modification to a fabrication process is relatively minimal and can use existing tools. Plates and slices can be cut to thicknesses thicker than the desired final thickness and then milled to form the grooves and achieve the desired final thickness. More tools of the same type (for example, more milling machines) may not be needed. Even if more tools of the same type need to be purchased, process development, as may be needed for a different type of tool that has not previously been used in fabricating scintillator arrays, is not needed.

Embodiments may be in accordance with any one or more of the items as listed below.

Item 1. A scintillator array comprising: scintillator elements; and a reflective sheet between a pair of scintillator elements, wherein the reflective sheet is substantially white and has a gloss value of at least approximately 50.

Item 2. The scintillator array of item 1, further comprising a clear adhesive material disposed between the reflective sheet and the scintillator elements.

Item 3. The scintillator array of item 1 or 2, wherein: each scintillator element includes a photosensor surface and side surfaces adjacent to the photosensor surface; the photosensor surface is adapted to provide scintillating light to a photosensor; and at least one of the scintillator elements has grooves along each of the side surfaces, wherein the grooves have lengths extending in a direction toward the photosensor surface.

Item 4. A scintillator array comprising: scintillator elements, wherein: each scintillator element includes a photosensor surface and a first side surface adjacent to the photosensor surface; the photosensor surface is adapted to provide scintillating light to a photosensor; and more than 50% of the scintillator elements have grooves along the first side surface, wherein the grooves have lengths extending in a direction toward the photosensor surface; and a clear adhesive material adjacent to the scintillator elements.

Item 5. The scintillator array of item 4, further comprising a reflective sheet between a pair of scintillator elements, wherein the clear adhesive material is disposed between the reflective sheet and each of the scintillator elements within the pair of scintillator elements.

Item 6. The scintillator array of item 5, wherein the reflective sheet is substantially white and has a gloss value of at least approximately 50.

Item 7. The scintillator array of any one of items 4 to 6, wherein: each scintillator element further comprises a second side surface adjacent to the photosensor surface; and more than 50% of the scintillator elements have grooves along the second side surface.

Item 8. The scintillator array of any one of items 4 to 6, wherein: each scintillator element further comprises a second side surface adjacent to the photosensor surface, a third side surface adjacent to photosensor surface, and a fourth side surface adjacent to the photosensor surface; and at least some of the scintillator elements have the grooves along each of the first, second, third, and fourth side surfaces.

Item 9. The scintillator array of item 8, wherein other scintillator elements have the grooves along at least two side surfaces and none of the grooves along one or two of the other side surfaces.

Item 10. A scintillator array comprising scintillator elements, wherein: each scintillator element includes a photosensor surface and side surfaces adjacent to the photosensor surface; the photosensor surface is adapted to provide scintillating light to a photosensor; and the scintillator elements include interior scintillator elements having side surfaces that do not have grooves that have lengths that are substantially parallel to a plane defined by the photosensor surface.

Item 11. A process of forming a scintillator array comprising: forming plates from a block of a scintillator material; placing a reflective sheet and a clear adhesive material between immediately adjacent plates; cutting a combination of the plates and reflective material into slices; and performing an activity including: forming first grooves along at least one surface of the plates, wherein the first grooves are oriented in a first direction that is substantially parallel to a centerline of the plates; forming second grooves along at least one surface of the slices, wherein the second grooves are oriented in a second direction that is substantially parallel to the centerline of the scintillator elements being formed; or both forming the first grooves and the second grooves.

Item 12. The process of item 11, wherein the reflective sheet is substantially white and has a gloss value of at least approximately 50.

Item 13. The process of item 11 or 12, further comprising fabricating the slices into the scintillator array, wherein a clear adhesive is not applied to the slices after cutting the combination of the plates.

Item 14. The process of any one of items 11 to 13, wherein the process includes: forming the first grooves along opposite surfaces of the plates before placing the reflective material between immediately adjacent plates; and forming the second grooves along opposite surfaces of the slices.

Item 15. The process of any one of items 11 to 14, wherein the first grooves, the second grooves, or both are formed by a tool that leaves tool marks along a surface of the plates or slices.

Item 16. The process of any one of items 11 to 14, wherein the first grooves, the second grooves, or both are formed by milling a surface of the plates or slices.

Item 17. The process of item 16, wherein milling is performed using particles with an average particle size of at least approximately 9 microns, at least approximately 15 microns, or at least approximately 30 microns.

Item 18. The process of item 16 or 17, wherein milling is performed using particles with an average particle size of no greater than approximately 900 microns, no greater approximately 300 microns, no greater than approximately 90 microns, or no greater than approximately 50 microns.

Item 19. The process of item 16 or 17, wherein the first grooves, the second grooves, or both are formed by polishing a surface of the plates or slices.

Item 20. The process of any one of items 11 to 19, further comprising placing a white reflective material along opposite sides of the slices.

Item 21. A radiation detection apparatus comprising: the scintillator array of any one of the preceding claims; and a photosensor optically coupled to at least one of the scintillator elements along the photosensor surface of the at least one of the scintillator elements.

Item 22. The scintillator array, scintillator, or radiation detection apparatus of any of the preceding claims, wherein each of the scintillator elements has a centerline axis, each of the grooves has a corresponding deviation angle as measured relative to the centerline axis, and a median value for the corresponding deviation angles is no greater than approximately 20°, no greater than approximately 9°, no greater than approximately 5°, no greater than approximately 2°, or no greater than approximately 0.9°.

Item 23. A scintillator comprising: a single scintillator element having a photosensor surface, a side surface and grooves along the side surface, wherein the photosensor surface is adapted to provide scintillating light to a photosensor, the side surface is adjacent to the photosensor surface, and the grooves have lengths extending in a direction toward the photosensor surface; a reflective sheet that substantially laterally surrounds the single scintillator element and is substantially white and has a gloss value of at least approximately 50; and a clear adhesive material that laterally surrounds the single scintillator element and is disposed between the single scintillating element and the reflective sheet.

Item 24. A radiation detection apparatus comprising: the scintillator of item 23; and a photosensor optically coupled to the scintillator along the photosensor surface of the scintillator.

Item 25. The scintillator array, radiation detection apparatus, or process of any of items 1 to 23, wherein: each scintillator element includes a photosensor surface, a first pair of opposing side surfaces adjacent to the photosensor surface, and a second pair of opposing side surfaces adjacent to the photosensor surface; and at least 50% of the scintillating elements have the clear adhesive material disposed along the first pair of opposing side surfaces and no clear adhesive along the second pair of opposing side surfaces.

Item 26. The scintillator array, scintillator, radiation detection apparatus or process of any of the preceding items, wherein the grooves extend along at least approximately 50%, at least approximately 75%, at least approximately 90%, or at least approximately 95% of the length of the scintillator or scintillator elements having the grooves.

Item 27. The scintillator array, scintillator, radiation detection apparatus, or process of any of the preceding items, wherein the grooves extend along substantially all of the length of the scintillator or the scintillator elements having the grooves.

Item 28. The scintillator array, scintillator, radiation detection apparatus, or process of any of the preceding items, wherein at least two of the grooves along any particular side surface have different depths, different widths, or different depths and widths.

Item 29. The scintillator array, scintillator, radiation detection apparatus, or process of any of the preceding items, wherein at least two spacings between immediately adjacent grooves are different spacings.

Item 30. The scintillator array, scintillator, radiation detection apparatus, or process of any of the preceding items, wherein the grooves along any particular side surface have a random assortment of depths, a random assortment of widths, or a random assortment of depths and widths.

Item 31. The scintillator array, scintillator, radiation detection apparatus, or process of any of the preceding items, wherein the spacings between immediately adjacent grooves are a random assortment of spacings.

Item 32. The scintillator array, scintillator, radiation detection apparatus, or process of any of the preceding items, wherein the grooves have a median depth of at least approximately 0.5 micron, at least approximately 2 microns, or at least approximately 5 microns.

Item 33. The scintillator array, scintillator, radiation detection apparatus, or process of any of the preceding items, wherein the grooves have a median depth of no greater than approximately 200 microns, no greater than approximately 90 microns, or no greater than approximately 50 microns.

Item 34. The scintillator array, scintillator, radiation detection apparatus, or process of any of the preceding items, wherein the grooves have corresponding lines, wherein at least approximately 50% of the corresponding lines intersect the photosensor surface.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Note that not all of the activities described above in the general description or the examples are required, that a portion of a specific activity may not be required, and that one or more further activities may be performed in addition to those described. Still further, the order in which activities are listed is not necessarily the order in which they are performed.

EXAMPLES

The concepts described herein will be further described in the Examples, which do not limit the scope of the invention described in the claims. The Examples demonstrate changes in the array configuration affect the light output of a scintillator array. The scintillator arrays as described below were substantially identical to one another except as noted below. The material for the scintillator elements was CsI(Tl). The scintillator elements had an aspect ratio of 7:1.

Array 1

Array 1 included conventional reflectors, which are white reflective sheets having a gloss value of 24 on one side and 25 on the opposite side. A clear epoxy was used between the scintillator elements and the conventional reflector. The scintillator elements were made from plates and slices as cut, that is without milling or polishing as previously described.

Array 2

Array 2 was substantially identical to Array 1 except that the conventional reflectors were replaced by reflective sheets having a gloss value of 66.

Array 3

Array 3 was substantially identical to Array 2 except that the plates and slices were milled and oriented within the array as previously described.

Comparative Array 1

Comparative Array 1 included the conventional reflectors. A white epoxy was used between the scintillator elements and the conventional reflector. The white epoxy was the clear epoxy described above mixed with white particles, such as $TiO_2$ or $Al_2O_3$ particles. The scintillator elements were made from mixed finished plates. As the plates were cut, some were undersized, others were oversized, and still others had sizes within a desired range. Each of the oversized plates had one side milled to the correct thickness. The mixed finished plates of the array included the undersized plates, the milled, oversized plates, and the plates cut to the desired thickness. With respect to the milled, oversized plates were assembled without regard to the orientation of grooves caused by milled. Hence, grooves for some of the milled plates were believed to be substantially parallel with the central axes of the scintillating elements, and grooves for the other milled plates were believe to be substantially perpendicular to the central axes of the scintillating elements.

The previously described arrays were exposed to $^{137}Cs$ and $^{241}Am$ radiation sources, where for each radiation source, the scintillator arrays were exposed to substantially the same dose of radiation. Tables 1 and 2 include average light output data and the improvement in light output (as compared to Comparative Array 1) for the data collected. Outliers were excluded before calculating the average light output.

TABLE 1

| | $^{137}Cs$ | | | |
| --- | --- | --- | --- | --- |
| | Array 1 | Array 2 | Array 3 | Comparative Array 1 |
| Average Light Output (arb. units) | 236 | 227 | 252 | 199 |
| % Improvement (over Comparative Array 1) | 18.5 | 14.2 | 26.7 | Not Applicable |

TABLE 2

| | $^{241}Am$ | | | |
| --- | --- | --- | --- | --- |
| | Array 1 | Array 2 | Array 3 | Comparative Array 1 |
| Average Light Output (arb. units) | 228 | 218 | 239 | 192 |
| % Improvement (over Comparative Array 1) | 18.5 | 13.6 | 24.3 | Not Applicable |

The light output was improved by about 18% when a white epoxy was replaced by a clear epoxy (Array 1 vs. Comparative Array 1). The light output can be further increased by about 10% when plates and slices are milled using embodiments as previously described (Array 3 vs. Array 2).

Certain features that are, for clarity, described herein in the context of separate embodiments, may also be provided in combination in a single embodiment. Conversely, various features that are, for brevity, described in the context of a single embodiment, may also be provided separately or in any subcombination.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and apparatuses that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillator array comprising:
   scintillator elements; and
   a reflective sheet between a pair of scintillator elements, wherein the reflective sheet is substantially white and has a gloss value of at least approximately 50,
   wherein each scintillator element includes:
      a photosensor surface adapted to provide scintillating light to a photosensor;
      a radiation receiving surface opposite the photosensor surface; and
      side surfaces extending between the photosensor surface and the radiation receiving surface; and
   wherein at least one of the scintillator elements has grooves present on each of the side surfaces, wherein the grooves have lengths extending in a direction toward the photosensor surface and have a random assortment of widths or depths.

2. The scintillator array of claim 1, wherein spacings between immediately adjacent grooves are a random assortment of spacings.

3. The scintillator array of claim 1, wherein the grooves have a median depth of at least approximately 0.5 micron and no greater than approximately 200 microns.

4. A scintillator array comprising:
   scintillator elements, wherein:
      each scintillator element includes:
         a photosensor surface adapted to provide scintillating light to a photosensor;
         a radiation receiving surface opposite the photosensor; and
         a first side surface extending between the radiation receiving surface and a photosensor surface; and
      more than 50% of the scintillator elements have grooves present on the first side surface, wherein the grooves have lengths extending in a direction toward the photosensor surface and a median depth of at least approximately 0.5 microns and not greater than approximately 200 microns; and
      a clear adhesive material adjacent to the scintillator elements.

5. The scintillator array of claim 4, wherein:
   the photosensor surface has a width and a length; and
   each scintillator element has a depth extending between the radiation receiving surface and a photosensor surface and an aspect ratio of the depth to either the width or the length of the photosensor surface of at least 2:1.

6. The scintillator array of claim 4, wherein the reflective sheet is substantially white and has a gloss value of at least approximately 50.

7. The scintillator array of claim 4, wherein:
   each scintillator element further comprises a second side surface extending between the radiation receiving surface and the photosensor surface; and
   more than 50% of the scintillator elements have grooves present on the second side surface.

8. The scintillator array of claim 4, wherein:
   each scintillator element further comprises a second side surface, a third side surface, and a fourth side surface, wherein the second, third, and fourth side surfaces extend between the photosensor surface and the radiation receiving surface; and
   at least some of the scintillator elements have the grooves present on each of the first, second, third, and fourth side surfaces.

9. The scintillator array of claim 8, wherein other scintillator elements have the grooves present on at least two side surfaces and none of the grooves present on one or two of the other side surfaces.

10. The scintillator array of claim 4, wherein each of the scintillator elements has a centerline axis, each of the grooves has a corresponding deviation angle as measured relative to the centerline axis, and a median value for the corresponding deviation angles is no greater than approximately 9°.

11. The scintillator array of claim 4, wherein the grooves have a random assortment of widths or depths.

12. The scintillator array of claim 4, wherein the grooves have a median depth of no greater than approximately 90 microns.

13. A process of forming a scintillator array comprising:
   forming plates from a block of a scintillator material;
   placing a reflective sheet and a clear adhesive material between immediately adjacent plates, wherein the reflective sheet is substantially white and has a gloss value of at least approximately 50;
   cutting a combination of the plates and reflective sheets into slices; and
   performing an activity including:
      forming first grooves on at least one surface of the plates, wherein the first grooves are oriented in a first direction that is substantially parallel to a centerline of the plates;
      forming second grooves on at least one surface of the slices, wherein the second grooves are oriented in a second direction that is substantially parallel to the centerline of the scintillator elements being formed; or
      forming both the first grooves and the second grooves.

14. The process of claim 13, further comprising fabricating the slices into the scintillator array, wherein a clear adhesive is not applied to the slices after cutting the combination of the plates.

15. The process of claim 13, wherein the process includes:
   forming the first grooves along opposite surfaces of the plates before placing the reflective material between immediately adjacent plates; and
   forming the second grooves along opposite surfaces of the slices.

16. The process of claim 13, wherein the first grooves, the second grooves, or both are formed by milling a surface of the plates or slices.

17. The process of claim 16, wherein milling is performed using particles with an average particle size of at least approximately 9 microns and no greater than approximately 900 microns.

18. The process of claim 13, wherein the first grooves, the second grooves, or both are formed by polishing a surface of the plates or slices.

19. The process of any one of claims 13, further comprising placing a white reflective material along opposite sides of the slices.

* * * * *